United States Patent
Stainvas Olshansky et al.

(10) Patent No.: US 9,529,087 B2
(45) Date of Patent: Dec. 27, 2016

(54) CURB DETECTION USING LIDAR WITH SPARSE MEASUREMENTS

(71) Applicant: GM GLOBAL TECHNOLOGY OPERATIONS LLC, Detroit, MI (US)

(72) Inventors: Inna Stainvas Olshansky, Modiin (IL); Yosi Buda, Petach-Tikya (IL)

(73) Assignee: GM GLOBAL TECHNOLOGY OPERATIONS LLC, Dearborn, MI (US)

( * ) Notice: Subject to any disclaimer, the term of this patent is extended or adjusted under 35 U.S.C. 154(b) by 313 days.

(21) Appl. No.: 14/339,515

(22) Filed: Jul. 24, 2014

(65) Prior Publication Data
US 2016/0026184 A1 Jan. 28, 2016

(51) Int. Cl.
| | |
|---|---|
| G01C 3/08 | (2006.01) |
| G01S 17/93 | (2006.01) |
| G01S 17/89 | (2006.01) |
| G01S 7/48 | (2006.01) |
| G05D 1/02 | (2006.01) |
| G06K 9/00 | (2006.01) |

(52) U.S. Cl.
CPC ............ G01S 17/936 (2013.01); G01S 7/4802 (2013.01); G01S 17/89 (2013.01); G05D 1/024 (2013.01); G06K 9/00 (2013.01); G05D 2201/0213 (2013.01)

(58) Field of Classification Search
CPC ............ G05D 1/024; G05D 2201/0213; G01S 17/936; G01S 17/89; G01S 7/4802
USPC ......................................................... 356/4.01
See application file for complete search history.

(56) References Cited

U.S. PATENT DOCUMENTS

| | | | |
|---|---|---|---|
| 8,364,334 B2* | 1/2013 | Au ....................... | G01C 21/165 701/23 |
| 8,537,338 B1* | 9/2013 | Medasani ............. | G01C 21/32 356/4.01 |
| 8,948,958 B1* | 2/2015 | Ferguson ............... | G01S 17/89 180/167 |

\* cited by examiner

Primary Examiner — Mark Hellner (57) ABSTRACT

A method of detecting curb-like barriers along a route of travel using a lidar sensing system. Sparse measurement per each ray tracing is captured from a sensor using the lidar sensing system. Each ray tracing is analyzed separately by a processor. Curb candidates are identified for each respective beam. Curb candidates are combined to generate multiple curb representative hypotheses. A weighting factor is applied to each curb hypothesis. Curb hypothesis that represents the curb is selected. The curb detection is applied to an autonomous guidance system related to guiding a vehicle along the route of travel.

32 Claims, 5 Drawing Sheets

CURB DETECTION USING LIDAR WITH SPARSE MEASUREMENTS

BACKGROUND OF INVENTION

An embodiment relates curb/road boundary detection of a traveled route. Curbs are important cues identifying the boundary of a roadway. Their detection is required by many automotive features such as evasive collision avoidance, lane centering, and curve speed warning (by providing road curvature definition). Due to the large variability in curb appearance and the surrounding world (weather, illumination, moving objects) their detection is a challenging task.

Different sensor such as mono cameras, stereo cameras, lidar sensors and their combination, can be used to detect curbs. The difficulty of the curb detection problem crucially depends on the sensor. Both mono and stereo camera systems largely depend on illumination conditions and suffer from illumination. Lidar being less dependent on illumination and providing accurate 3D information differ in resolution and in the sparsity of the captured 3D point clouds.

Curbs can be "reliably" detected using dense point clouds obtained with the Velodyne sensor, but Velodyne sensor is very expensive and is used mainly for surveying (mapping) the environment. Currently, there is no a sensor on the automotive market with the same resolution.

SUMMARY OF INVENTION

An advantage of an embodiment is the identification of a curb or other barrier/road outlines along a route of travel that is determined as a function of a sensing system utilizing sparse measurement data. Curb detection using lidar providing sparse measurement data, including, but not limited to an IBEO LUX sensor. The system as described herein detects curbs in a real environment using a single sparse measurement sensor. It should be understood that the system described herein is flexible to use with other types of sensors for increasing the confidence of detecting a curb/barrier; however, the system as described herein can reduce cost and complexity and detect a curb using a single sparse measurement sensor only. The results of this system may be utilized by vehicle application systems such as parallel parking systems, evasive collision avoidance systems, lane centering systems, curves speed warning systems, and road following systems. The system may further be used in manufacturing environments for navigation guidance in manufacturing facilities. Lidar sensors with sparse measurements are robust to illumination and mild weather conditions and are less costly than systems that are complex or data intensive.

An embodiment contemplates a method of detecting boundary barriers along a route of travel using a Lidar sensing system. Sparse measurement ray tracing is captured from a sensor using the lidar sensing system. Each ray tracing is analyzed separately by a processor. Curb candidates are identified per each respective ray tracing. Curb candidates are combined to generate multiple curb representative hypotheses. A weighting factor is applied to each curb hypothesis. Curb hypothesis is selected representing the curb. Applying the curb detection to a autonomous guidance system related to guiding a vehicle along the route of travel.

BRIEF DESCRIPTION OF DRAWINGS

FIGS. 4$a$-$h$ illustrate graphs for ray tracing analysis.

DETAILED DESCRIPTION

Figure 1:
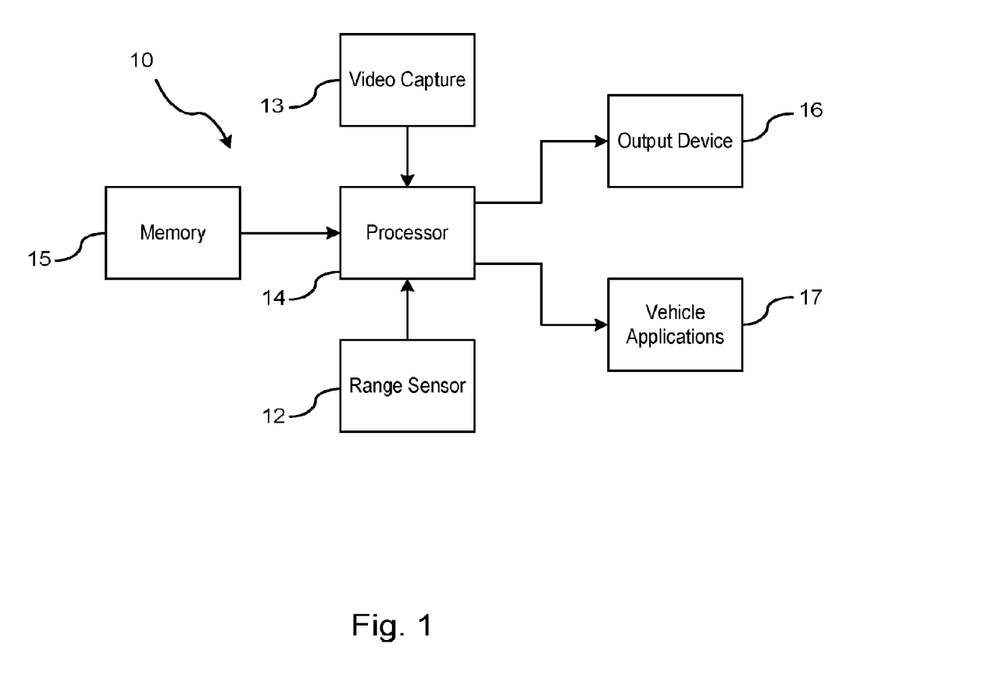
FIG. 1 is a block diagram of a curb detection system.

FIG. 1 illustrates a block diagram of the curb detection system. It should be understood while the embodiment described herein pertains to a vehicle traveling on the road, the invention is not limited to vehicles traveling along a road, but can include other boundary detections that include, but are not limited to, manufacturing facilities with autonomously driven vehicle or robots. A vehicle is shown generally at 10. The vehicle 10 includes a lidar-based sensor 12 that illuminates a target and analyzes the reflected light remote sensing technology that measures distance by illuminating a target with a laser and analyzing the reflected light. The vehicle 10 utilizes remote sensing technology, such as Lidar, to perceive obstacles in a route of travel. The lidar sensor perceives a 3D world based on time of flight principle. The vehicle can then autonomously use this information for obstacle detection and avoidance to navigate safely through environments. The object detection sensors 12 include sparse lidar sensors including, but not limited to, IBEO LUX sensors. The IBEO LUX sensor has 4 layers of lasers with the vertical field of view of 3.2 degrees and scanning rate of either of 12.5 Hz, 25 Hz, and 40 Hz. In addition, a vision-based imaging system 13 may be used to capture images of the road of travel. The lidar-based sensors 12 may be utilized in cooperation with the vision-based imaging system 13 for curbs and other types of lane barriers along the road of travel.

Both the lidar-based sensors 12 and the vision-based imaging system 13 obtains data of the vehicle environment surrounding the vehicle. Preferably, the object detection sensors 12 and the vision-based imaging system 13 obtains data forward of the vehicle when the vehicle is driven in a forward direction or may capture images to the rear or to the sides when the vehicle is backing up.

A processor 14 is coupled to the object detection sensors 12 and the vision-based imaging system 13. Alternatively, the processor 14 may be a shared processor of another device. The processor 14 identifies the curbs and other lane barriers based on the techniques described herein. A memory 15 may be used to store data obtained by the object detection sensors 12 or the vision-based imaging system 13. Moreover, the memory 15 may store data used by the processor during the curb detection analysis.

The vehicle 10 may include output devices 16 that include, but are not limited to, display devices for enhancing a driver's view of a scene exterior of the vehicle. Other vehicle applications 17 may include, but are not limited to, collision avoidance applications, clear path detection applications, object detection applications, and vehicle motion applications, autonomous vehicle navigation systems.

As illustrated in FIG. 1, the system described herein uses the lidar-based sensors that include the main sensors which are preferably an IBEO LUX sensor (hereinafter referred to as IBEO) with four beams and a simple web-camera mounted on a vehicle. It should be understood that for the purposes of this description, that IBEO sensors will be discussed herein as the primary Lidar-based sensor; however, it should be understood that the invention is not limited to the IBEO sensor, and can include other sparse measurement sensors (e.g., SICK Lidar sensors). The IBEO is tilted down to enable ground, curb surface and sidewalk scanning. The IBEO as utilized herein is considered the leading sensor. A 3D-box based calibration procedure is used to estimate extrinsic parameters of the camera relative to the lidar. The internal camera parameters are estimated by a standard calibration procedure using a checkerboard pattern. In particular, image ground contours can be fully reconstructed as 3D curves in the IBEO coordinate system.

Data streams from both sensors are calibrated and synchronized. Curb detection techniques are developed in two stages. In the first stage, curbs are found from IBEO sensor data only and the camera is used for visualization only. In the second stage curbs are found by fusing camera and IBEO data.

Figure 2:
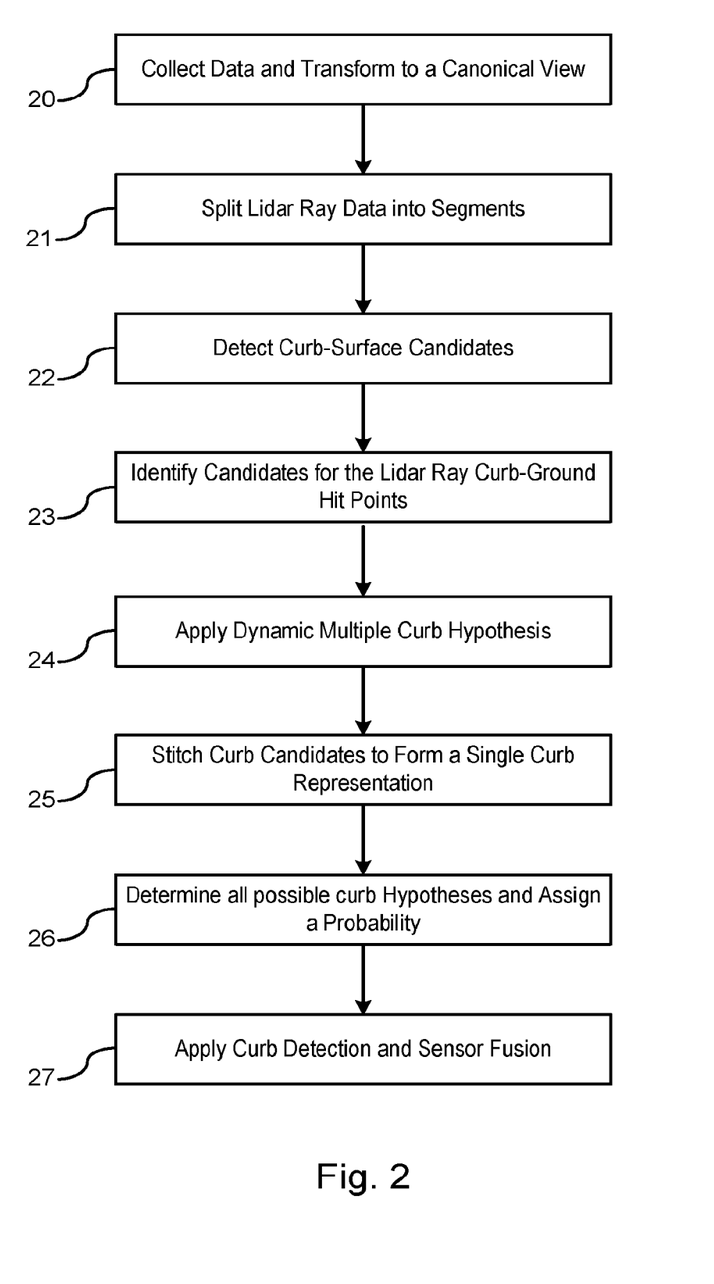
FIG. 2 is a flowchart of a method for detecting curbs.

The technique illustrated in FIG. 2 describes detection of curbs and other barriers using the IBEO LUX sensors.

In block 20, data collected from the sensors is transformed to a canonical view so that the ground plane coincides with the xy plane in a new coordinate system. The ground estimation is performed using RANSAC technique which shifts and rotates the data to match xy plane and ground plane.

In block 21, Lidar ray data is split into segments based only on planar information (e.g., projection onto the ground plane). This provides a preliminary pre-object segmentation of the ray to different possible object segments in the projected to a ground 2d world. Lidar ray data is ordered by increasing scanning angle θ in the polar coordinate system. The ordered points (but not necessary consecutive ordering) are assumed to belong to a same pre-object segment if the order points are separated less than some number of sequential points and either of two following conditions are satisfied: (i) the planar distance between ordered points is less than some predefined threshold distance; or (ii) the prediction of the next point scan position is within a certain distance.

The ray segmentation technique starts by declaring a first object-segment starting from a first point and collecting points until the pre-object segmentation condition (i) is satisfied. When a consecutive point violates condition (i), a new second object is declared. The next ray point may belong to either the first or second objects or can be a starting point for a next new (third) object. If the consecutive point can represent both objects, a preference is given to the new second object. This technique is recursively executed to proceed with all ray points and distribute the ray points between segments. Missing points may be inserted between gaps in the same segment to prevent splitting the same pre-object into smaller parts that are the result of noisy lidar returns or very small obscuring objects. In addition, the obtained sequential segments have starting points ordered by the scanning angle θ.

In block 22, curb-surface candidates are detected, which are parts of the ray belonging to curb-surface rising from the ground up. Sufficiently long segments are smooth by a bilateral filter which are processed per x, y, z coordinates in parallel and short segments are ignored. Segments with a low growth profile in $(dz<dH_{min})$ are marked as probably belonging to the ground. The remaining segments are further analyzed to find curb-surface candidates. The curb-surface candidates are characterized by the three main properties.

First, the curb candidates are monotonically growing in height (z direction), as a ray climbs up along the curb surface: $\tau_z>0$. In this formulation $\tau(p)$ is a tangential vector to the 3d ray tracing curve and calculated in the point p by fitting a linear model in the vicinity $\Delta n_p$ points ahead (i.e., forward). Projections of this vector onto the x, y, z direction and xz plane are denoted as $\tau_x$, $\tau_y$, $\tau_z$ and $\tau_{xz}$, respectively.

Secondly, curb surface segments are monotonically decreasing in the sensor x direction sense a ray is running towards the sensor along the curb surface $\tau_x<0$.

Lastly, a ray's tangential vector projection onto the xz plane along curb surface does not change its direction drastically and is represented by the following:

$$\Delta\tau_{xz}(p)=\tau_{xz}(p)\cdot\tau_{xz}(p-\Delta n_n)>\cos(\phi\star),$$

where $\cos(\phi\star)$ is a threshold parameter set to 0.7. That is, the ray's tangential vector projected onto the xz plane should not change its direction more than $\phi\star$ along the curb surface, i.e. $\phi\star=45°$. Parameters are set based on statistical observations of a large amount of data, but it is also determined that these parameters correlate with the curb design standards. It should be noted that the value $\Delta\tau xz$ is very small along the ray part lying on the ground as its projection onto xz plane almost collapses to a point as shown in FIG. 4.

Figure 4A:
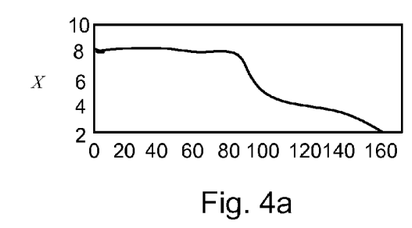
Figure 4B:
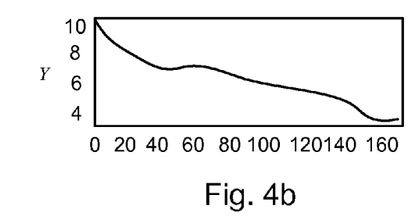
Figure 4C:
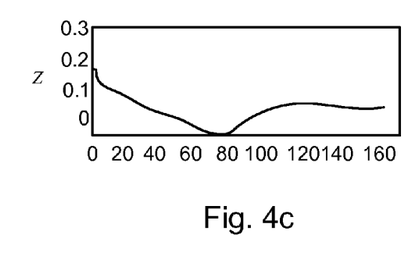
Figure 4D:
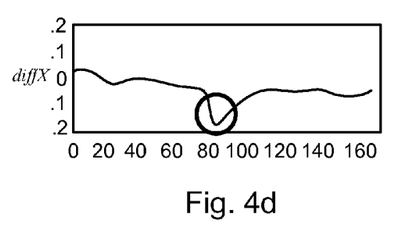
Figure 4E:
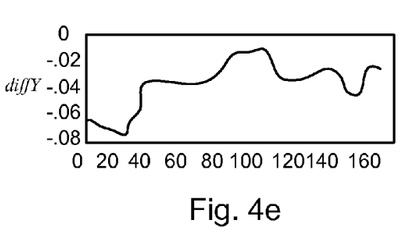
Figure 4F:
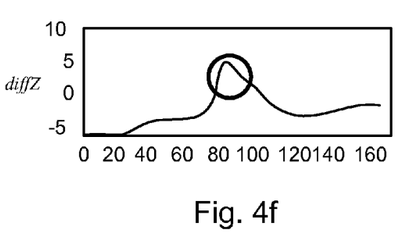
Figure 4G:
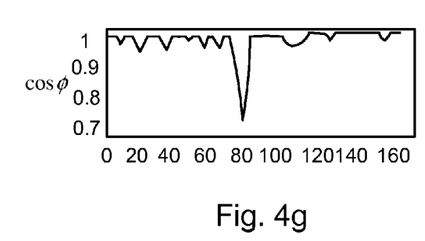
Figure 4H:
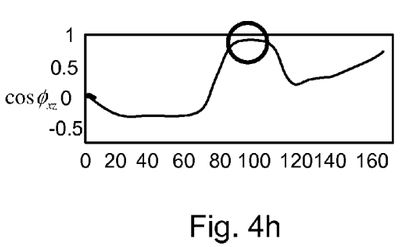

In FIGS. 4(a)-(h), ray tracing analysis is shown. FIGS. 4(a)-(c) show x, y, z profiles of the ray and the corresponding plots of FIGS. 4(e)-(f) are there associated for derivatives $\tau_x$, $\tau_y$, $\tau_z$, respectively. FIG. 4(d) illustrates a slope change over a ray tracing 3d curve. This value is small in the regions where the curve changes its direction, achieving a minimum in the bending points, such as hit points between the curb and the ground surfaces. Generally, the points with a small $\Delta\tau$ value are corner points that cross points between the IBEO scanning plane and real-world surfaces having different orientations.

Several curb-surface candidates can be found per ray as there can be (i) other objects on the road such as bicycles, vehicles, trucks and (ii) other objects straight after the side walk area such as bushes, fences and hedges. Both these types of objects can be detected as curb surface candidates.

Simple heuristics can be used to eliminate some of these false candidates by constraining the curb surface candidates to be rising in a typical curb range. That is, the curb surface candidates should satisfy the condition:

$$h_{min}<dz<h_{max}$$

where $h_{min}$ is a curb height minimum and $h_{max}$ is a curb height maximum. As a result, high objects such as vehicles, walls, and very small objects are eliminated. For example, an exemplary curb limit may have a minimum height of 5 cm and a maximum height of 28 cm; however, depending on the type of curb or other type of boundary, the minimum and maximum height limits may be set different. Furthermore, a determination is made that the generated slope is larger than a respective angle $$\text{respective angle} \cdot \frac{dz}{dy} > \tan(\psi\star)$$

and $\psi\star$ is set to a predetermined angle (e.g., 10°). While this technique removes some false candidates, there can still be a few candidates found per ray. The results are approximately ⅓ candidates per each ray after false curb-surface candidate removal.

Figure 3:
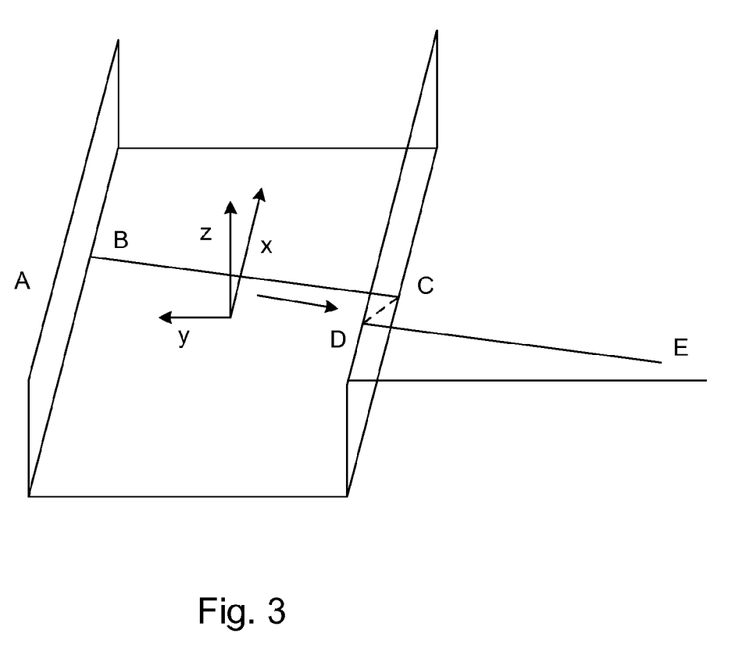
FIG. 3 an exemplary cross section view of a curb illustrating lidar ray intersection points.

In block 23, candidates for the lidar ray curb-ground hit point are identified, which is the ray point where curb starts to rise from the ground as shown in FIG. 3. Due to road debris surrounding the road and the surface imperfection of the road, several candidates or no candidates may be found per ray.

In block 24, a dynamic multiple curb hypothesis technique is performed where an objective is to connect the found curb-ground hit point candidates in the most feasible manner in the 2d ground plane xy. The brute-force technique is applied by considering all possible curb-ground hit point combinations (e.g., one ground-curb hit point candidate or ignore candidates for a ray) and assigning to each curb hypothesis a confidence (i.e., probability) measure to be a curb. There are two main elements defining this step: (1) the dynamical connection mechanism itself and (2) definition of the confidence measure. The dynamical connection mechanism is a process of active convergence of the initial curb curve to the better final curb curve solution based on the point cloud data.

Prior to starting the connection process, a point cloud is first processed to remove points that have a very high certainty belonging to the ground. The dynamical connection process combining curb-ground hit point candidates is initiated.

In the initial step, the curb-ground hit points are connected by a linear curve fitting the curb-hit points. This is an initial curb curve hypothesis used to select the relevant non ground cloud points and decide whether the curb-curve adaptation process should be continued. The relevant non-ground points are defined as the closest points from the curb hypothesis line at the distance while not exceeding $\delta_{dist}=30$ cm. The pertinence of this step is to calculate support of the curb curve hypothesis by the non-ground point clouds. If the number of relevant (i.e., supporting) points is less than two, then the curb hypothesis curve process is stopped and the hypothesis is given a zero confidence. Otherwise, the process is further continued and the confidence measure is calculated as:

$$P_{conf}=P_{dist} \times P_{div} \times P_{in}^{1/3} \times P_{long}, \quad (3)$$

$$P_{dist}=(1-E[\|L(p)-P_c(neig(L(p)))\|]/(\delta_{dist}+\epsilon) \quad (4)$$

where $P_{dist}$, $P_{div}$, $P_{in}$, $P_{long}$ are probabilities that the curb is a curb based on the average curve distance from the point cloud, diversity in sensor points generating the curve, percent of inlier cloud points supporting curve and prolongation of the curb-curve, respectively. In the Eq. 4, $L(p)=[x(p), y(p)]$ is a curve point (p is the natural parameter of the curve) and $Pc(neig(L(p)))$ is a closest point from the point cloud to $L(p)$, $\|\cdot\|$ is an $L_2$, and E is the average over all points p of the line L.

Figure 6:
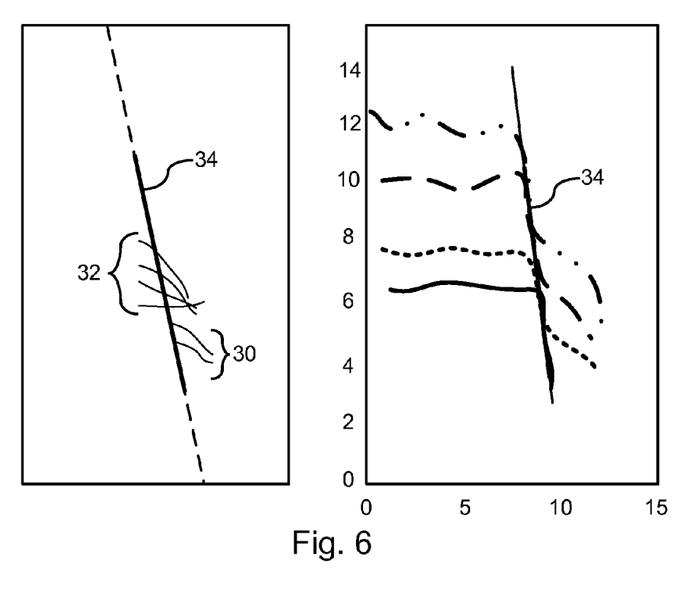
FIG. 6 is an exemplary graph illustrating multiple curve hypothesis.

The probability of the curb by diversity L encourages the curves that are composed from the hit points of all four layers of the IBEO sensor and is expressed as:

$$P_{div}=En_{min}+(1-En_{min})/En_{max}*En, \quad (5)$$

$$En=Entropy([p_1,p_2,p_3,p_4]) \quad (6)$$

where En is the IBEO "ray" entropy for the relevant points and $p_i$ is proportion of ith-ray points in the relevant point cloud. The minimal entropy $En_{min}=Entropy([1, 0, 0, 0])=0.25$, when relevant points belong to a single IBEO ray. The maximal entropy $En_{max}=Entropy([0.25, 0.25, 0.25, 0.25])=\log_2(4)=2$, when all relevant points are distributed evenly among the IBEO rays. This measure is guaranteed to be in the range [0 1]. The probability by the percent of inliers $P_{in}$ is the percent of inliers (fraction of curve points supported by the point cloud). The probability by the curve prolongation encourages curves with the prolongated support in the vertical direction:

After the initial step, the supporting points of the previous step are used to continue curb curve fitting. The number of fitting points is increased now and a larger flexibility is given to the fitting curve. A regularized polynomial of the second order may be used after the first iteration. The regularization suppresses too large of values of the higher order term in the polynomial. The confidence measure $Pk_{conf}$ (k is the iteration number) is calculated according to Eq. 3 for this new curve $L_k$. If $p_{conf}^k > p_{conf}^{k-1}$, then the process is continued, the regularization parameter $\mu k=\mu k-1*\lambda relax$ is reduced. The maximal number of steps to run the dynamical process is also defined. Finally, the curb curve that produces the largest confidence is declared as a final curb curve and its confidence is returned. FIG. 6 is an exemplary graph demonstrating all possible hypothesis with the best hypothesis being selected. Curve 30 represents the non-ground Lidar points, curve 32 represents the all possible hypothesis, and curve 34 is the best hypothesis.

Referring again to FIG. 2, in block 25, and in response to identifying the curb-surface candidates per rays, the next step is to stitch curb candidates to form a single curb representation. There are several techniques to perform this step, such as a brute force approach, where all possible combinations referred to as curb hypothesis are analyzed and the weight is given to each of them. The hypothesis having the most favorable results is declared as a "found curb" and its confidence is assigned.

Figure 5:
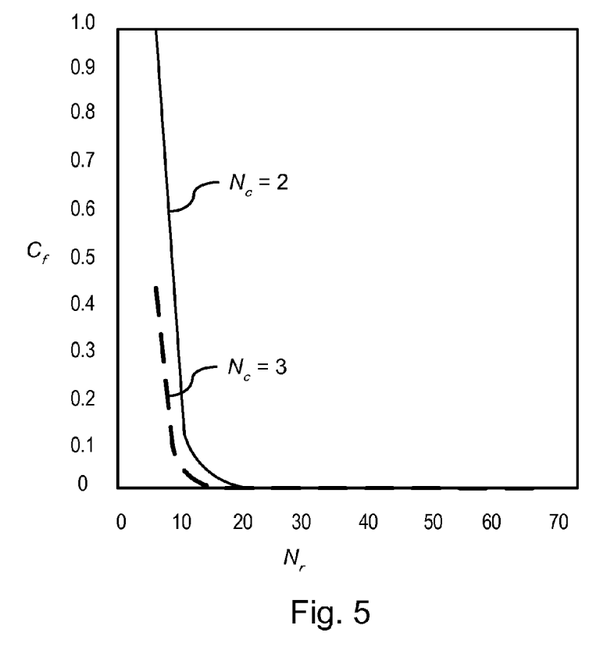
FIG. 5 is an exemplary graph illustrating a comparison between a brute force technique and a Markov Chain Model technique.

Another technique is to consider for curb candidates stitching is using a Markov Chain Model (MCM) and associating a second order potential function defining the quality of stitching curb surface candidates into the best curb hypothesis. For example, if the assumption is made that there are $N_r$ sensor rays in the sensor and each ray has $N_c$ candidates, when the number of hypotheses to be tested is $(N_c+1)N_r-1$ for the brute force approach and $N_r(N_c+1)^2-1$ for the second MCM approach. For a respective scenario of four rays and two candidates per ray, the computational cost $C_f$ of both approaches is the same and this is the most common situation for detecting a curb per frame. Even when $N_c=3$, the computational cost factor is only twice. However, with slightly different parameters, the computational cost reduces significantly by using MCM approach (see FIG. 5).

Alternatively, the brute force approach enables the introduction of complicated confidence functions, rather than constraining them to a second order potential function.

In utilizing the brute force approach, the curb-ground hit points are the points where three surfaces intersect simultaneously: (1) the sweep plane of the lidar, (2) the ground plane, (3) and the curb surface. The hit point is located before the curb surface and is a corner point of the line ray tracing curve. An interval is defined for searching a hit point per each curb-surface candidate. The tracing curve is denoted as:

$$s(k)=[x(k),y(k),z(k)]$$

where the curb-surface starting and terminal points are $k_0$ and $k_e$, respectively.

The interval $[n_0, n_m]$ is defined as a searching interval for the curb-ground hit points. The starting point is located at a predefined distance backward along y-axis before the curb-surface starting point:

$$n_0=\min_n n:y(k_0)-y(k_0-n)>\delta_{y,b}$$

where $\delta_{y,b}=40$ cm.

The search interval terminal point is located somewhere in the middle of the curb-surface point, but not far from the curb-surface starting point $k_0$ forward along y direction:

$n_m = \min_n n : n \leq [(k_0+k_e)/2] \& y(k_0+n)-y(k_0) > \delta_{yf}$ where $\delta_{yf}=10$ cm. The corner points are defined by searching local minima of the smoothness measure $\Delta\tau$ of the ray tracing curve in the interval [n0 nm] which is defined as follows:

$\Delta\tau(p)=\tau(p)\cdot\tau(p-\Delta n_p)$.

For points belonging to a linear curve $\Delta\tau$ is maximal and is equal to 1. When the curve changes its direction, $\Delta\tau$ decreases and reaches local minimum at the corner points.

In block 26, all possible curb hypotheses are built and are assigned a probability to represent a curb. The hypothesis with the maximal probability is selected as a curb. The following steps describe the main technique in detail.

In block 27, the technique is further modified to use camera data and temporal information by modifying the confidence measure to include the probability by camera and prior:

$P^m_{conf} = P_{conf} \times P_{cam} \times P_{prior}$, (7)

where $P_{cam}$ is a probability of the curve to be a curb based on the camera data. One of the easiest variants can be calculating an average distance and orientation between the edge map data of the image and projected curve found in lidar data. If the discrepancy is small, the new curve gets larger probability. The probability by prior $P_{prior}$ measures compatibility between previous curb detection and the curve; and can be set based on the two curves discrepancies. If inertial measurement unit information is available the previous curb result should be first transformed to a new sensor position.

As described earlier, a MCM based approach can be utilized for computational efficient stitching of the curb surface candidates into a curb. The issue of stitching is formulated as a maximization of the joint probability which is represented by the formula:

$P(r) = P(r_1, r_2, \ldots, rN_r)$, (8)

where $N_r$ is the number of lidar rays, and $r_K$, k=1 ..., $N_r$ are discrete random variables. The joint probability P(r) is defined by the Markov chain. This treatment is possible since stitching has a natural order defined from the lowest lidar ray to the higher lidar rays. The same treatment can be expanded to any merged data where the only additional required operation is ordering the scan rays in the merged data and simple ordering the ray tracings in vertical direction will suffice. The joint probability is defined as:

$$P(r) = \frac{\Pi_p \Psi_p(r_p) \Pi_{p,q} \Psi_{pq}(r_p, r_q)}{Z}$$

$$P(r) = \frac{\exp^{(-E(r))}}{Z}$$

$$E(r) = \Sigma_p \Theta(r_p) + \Sigma_{p,q} \Theta_{pq}(r_p, r_q)$$

The stitching problem is then equivalent to minimization of the energy function (i.e., of the second order) that can be solved using dynamical programming computationally efficiently $O(N_r N^2_c)$. The unary term $\Theta_p$ expresses a quality of the curb surface candidates, while $\Theta_{pq}$ is responsible for consistency between sequential curb surface candidates corresponding to curb surface candidates scanned by two sequential rays (e.g., close lasers). The possible $\Theta(p)$ should support curb-surface candidates with a certain height range, slope and presence of the dominant edges in the color space (e.g., camera space):

$$\Psi_p(r_p) = \exp\left(\frac{-(h_p - h_0)^2}{2\sigma_h^2} + \frac{-(\phi_p - \phi_0)^2}{2\sigma_\phi^2} + \theta_{edges}\right) \quad (10)$$

where $\Theta_{edges}$ is a characteristic of the edges and sharpness measure of their orientation distribution, where $h_0$ is an expected height, $\phi_0$ is an expected orientation, $h_p$ is the candidate height as measured by the sensor, $\phi_p$ is a candidate orientation as measured by the sensor, and $\sigma$ are uncertainty parameters related to $h_0$ and $\phi_0$. If these parameters are small, we are very certain about curb model (height/orientation), if large more curbs hypotheses are possible. Instead of utilizing simple Gaussian distributions, more complicated measures can be used that model different curb design models. Preliminary analysis should be done for simplification of this intractable analytical expression. Consistency terms will support connection of curb candidates having similar properties in image and lidar data. That is, their orientations in the lidar plane and image plane should be consistent, as well as their slopes and heights:

$$\Psi_p(r_p, r_q) = \exp\left(\frac{-(h_p - h_0)^2}{2\sigma_{h2}^2} + \frac{-(\phi_p - \phi_0)^2}{2\sigma_{\phi,2}^2} + \frac{-(M_q - M_p)^2}{2\sigma_M^2}\right) \quad (11)$$

where $M_q$, $M_p$ are curb surface properties calculated in camera/image plane.

While certain embodiments of the present invention have been described in detail, those familiar with the art to which this invention relates will recognize various alternative designs and embodiments for practicing the invention as defined by the following claims.

What is claimed is:

1. A method of detecting boundary barriers along a route of travel using a lidar sensing system, the method comprising the steps of:
    capturing sparse measurement ray tracing from a sensor using the lidar sensing system;
    analyzing each ray tracing separately by a processor;
    identifying curb candidates per each respective ray tracing;
    combining curb candidates to generate multiple curb representative hypotheses;
    applying a weighting factor to each curb hypothesis;
    selecting curb hypothesis representing the curb; and
    applying the curb detection to a autonomous guidance system related to guiding a vehicle along the route of travel.

2. The method of claim 1 wherein identifying curb candidates from each respective ray tracing further comprises the steps of:
    detecting a ground surface;
    applying ray tracing segmentation per each ray tracing;
    detecting curb surface candidates in each respective segment;
    identifying curbs by connecting the curb surface candidates to form a single curb representation.

3. The method of claim 2 wherein the ground surface is detected utilizing a RANSAC technique.

4. The method of claim 2 wherein the ground surface is detected by cloud points hitting the ground surface, wherein the cloud points are transformed to a coordinate system having z-axis orthogonal to the ground surface, and wherein points belonging to the ground plane have a height substantially equal to zero.

5. The method of claim 4 wherein applying ray tracing segmentation for each ray tracing comprising the following steps:
  splitting each ray tracing data into segments based on planar xz data only;
  ordering the ray tracing data by increasing a scanning angle in polar coordinate system; and
  determining that the ordered points belong to a same segment in response to either a planar distance between the order points less than a predetermined threshold distance or a prediction of a next point scan position being within a predetermined distance.

6. The method of claim 5 wherein a starting position of the segment is identified and consecutive points are collected starting from the first point until the determination is made that the planar distance between the order points is less than the predetermined threshold distance.

7. The method of claim 6 wherein the ray tracing segmentation is recursively applied to distribute all ray points among the segments.

8. The method of claim 2 wherein the step of detecting curb surface candidate points in each respective segment further comprises:
  smoothing segments utilizing the bilateral filter;
  discarding segments less than a predetermined minimum height;
  discarding segments greater than a predetermined maximum height; and
  discarding segments where a slope of a respective segment is less than a predetermined angle.

9. The method of claim 8 wherein the slope of the segment is determined by the following formula:

$$\frac{dz}{dy} > \tan(\psi).$$

10. The method of claim 2 wherein identifying curbs by connecting the curb surface candidates to a single curb representation includes applying a brute force technique wherein every combination of each of the identified curb surface candidates are analyzed.

11. The method of claim 10 wherein a weight is applied to each potential combination and a confidence is determined.

12. The method of claim 11 wherein a respective combination having a highest confidence among each combination evaluated is selected as a best fit curb.

13. The method of claim 2 wherein identifying curbs by connecting the curb surface candidates to a single curb representation includes identifying curb-ground hit points and applying a brute force technique wherein combinations of each of the identified curb-ground hit points are analyzed.

14. The method of claim 13 wherein the curb-ground hit points include points each of where a sweep plane of a lidar beam, the ground surface plane, and the curb surface candidate intersect.

15. The method of claim 14 wherein the curb-ground hit points are determined from a search interval that includes a curb-surface starting point and a curb-surface termination point.

16. The method of claim 15 wherein a tracing curve for tracing the curve along the curb-ground hit points over the search interval is represented by the following formula $$s(k)=[x(k),y(k),z(k)]$$

where the curb-surface starting and terminal points are $k_0$ and $k_e$, respectively, and $[n_0, n_m]$ represents the search interval.

17. The method of claim 16 wherein the starting point for the search is located at a predefined distance backward along a y-axis before a curb-search starting point and is represented by the following formula:

$$n_0 = \min_n n : y(k_0) - y(k_0-n) > \delta_{y,b}$$

where $\delta_{y,b}$ a predetermined backward distance.

18. The method of claim 17 wherein the termination point for the search interval is located at a predefined distance forward from the curb-search starting point along a y-axis and is represented by the following formula:

$$n_m = \min_n n : n \leq [(k_0+k_e)/2] \& y(k_0+n) - y(k_0) > \delta_{y,f}$$

where $\delta_{y,f}$ is a predetermined forward distance.

19. The method of claim 18 wherein a smoothness measure of the ray tracing curve in the interval is represented by the following formula:

$$\Delta\tau(p) = \tau(p) \cdot \tau(p - \Delta n_p).$$

20. The method of claim 13 wherein combining curb candidates to generate multiple curb representative hypotheses includes applying a dynamic multiple hypothesis that comprises the following steps:
  removing points from a point cloud that have a confidence greater than a predetermined confidence threshold of belonging to a ground surface;
  connecting curb-hit ground point candidates by a linear curve that fit the curb-hit points; and
  determining whether relevant non-ground hit points along the curb is greater than a hit point threshold.

21. The method of claim 20 further comprising the step of determining whether the curb surface candidate is a curb in response to the relevant non-ground hit points being greater than the hit point threshold, the determination of whether the curb surface candidate is a curb is based on a confidence probability represented by the following formula:

$$P_{conf} = P_{dist} \times P_{div} \times P_{in}^{1/3} \times P_{long}$$

where $P_{dist}$ is an average curve distance from the point cloud, $P_{div}$ is a diversity in sensor points generating the curve, $P_{in}$ is a percent of inlier cloud points supporting the curve, and $P_{long}$ is a prolongation of the curb-curve.

22. The method of claim 21 wherein the average curve distance $P_{dist}$ is represented by the following formula:

$$P_{dist} = (1 - E f \| L(p) - P_c(\text{neig}(L(p))) \|) / (\delta_{dist} + \epsilon) \quad (4)$$

where $L(p)=[x(p), y(p)]$ is a curve point and $Pc(\text{neig}(L(p)))$ is a closest point from the point cloud to $L(p)$, $\|\cdot\|$ is an $L_2$ norma, and E is the average over all points p of the line L.

23. The method of claim 22 wherein the diversity in sensor points $P_{div}$ is represented by the following formula:

$$P_{div} = En_{min} + (1 - En_{min})/En_{max} * En$$

$$En = Entropy([p_1, p_2, p_3, p_4])$$

where En is an IBEO ray entropy for the relevant points, $p_i$ is proportion of ith-ray points in the relevant point cloud, $En_{min}$ is the minimal entropy where $En_{min} = Entropy([1, 0, 0, 0]) = 0.25$ when relevant points belong to a single ray, and $En_{max}$ is the maximal entropy where $En_{max} = Entropy([0.25, 0.25, 0.25, 0.25]) = \log_2(4) = 2$ when all relevant points are distributed evenly among the rays.

24. The method of claim 22 wherein the curve prolongation probability $P_{long}$ is represented by the following formula:

$$P_{long}=\min[(1,R_{vert}(\text{inliers})/(R_{vert}(PC))],$$

where $R_{vert}(\text{inliers})$, and $R_{vert}(PC)$ are vertical ranges of the curve inlier and cloud points, respectively.

25. The method of claim 22 further comprising the step of: capturing image data by an image-based capture device; determining a probability of curb based on the image data; determining a probability confidence measure that is a function of each of the confidence probability, an image data probability, and a probability of a prior that is a function of a compatibility between previous curb detections and a current curb estimation.

26. The method of claim 25 wherein the probability confidence measure is represented by the following formula:

$$P^m_{conf}=P_{conf} \times P_{cam} \times P_{prior},$$

where $P_{conf}$ is the confidence probability, $P_{cam}$ is a probability of the curb based on the image data, and $P_{prior}$ is the compatibility probability between a previous curb detection and the current curve estimation.

27. The method of claim 2 wherein identifying curbs by connecting the curb surface candidates to a single curb representation includes identifying curb-ground hit points and applying a Markov Chain Model technique wherein curb surface candidates are stitched into a curb.

28. The method of claim 27 wherein stitching of the curb surface candidates is performed as a maximum of a joint probability represented by the following formula:

$$P(r)=P(r_1,r_2,\ldots,rN_r),$$

where $N_r$ is the number of lidar rays, and $r_K$, $k=1\ldots,N_r$ are discrete random variables.

29. The method of claim 28 wherein stitching process utilizes a natural order defined from a lowest lidar ray to a higher lidar ray.

30. The method of claim 29 wherein the joint probability is represented as the following equation:

$$P(r) = \frac{\Pi_p \Psi_p(r_p) \Pi_{p,q} \Psi_{pq}(r_p, r_q)}{Z}$$

$$P(r) = \frac{\exp^{(-E(r))}}{Z}$$

$$E(r) = \Sigma_p \Theta(r_p) + \Sigma_{p,q} \Theta_{pq}(r_p, r_q)$$

wherein $\Theta(r_p)$ is a unary term represents a quality of the curb surface candidates, and $\Theta_{pq}$ is a pairwise potentials term that represents a consistency between sequential curb surface candidates corresponding to curb surface candidates scanned by two sequential rays.

31. The method of claim 30 wherein a height range and slope of the curb surface candidate for the unary term is represented by the following equation:

$$\Psi_p(r_p) = \exp\left(\frac{-(h_p - h_0)^2}{2\sigma_h^2} + \frac{-(\phi_p - \phi_0)^2}{2\sigma_\phi^2} + \theta_{edges}\right)$$

where $\theta_{edges}$ is a characteristic of edges and sharpness measure of the edges orientation distribution.

32. The method of claim 30 wherein a height range and slope of the curb surface candidate for the pairwise potential term is represented by the following equation:

$$\Psi_p(r_p, r_q) = \exp\left(\frac{-(h_p - h_0)^2}{2\sigma_{h2}^2} + \frac{-(\phi_p - \phi_0)^2}{2\sigma_{\phi,2}^2} + \frac{-(M_q - M_p)^2}{2\sigma_M^2}\right)$$

where $M_p$ and $M_p$ are curb surface properties calculated in an image plane.

\* \* \* \* \*